Patented Jan. 6, 1948

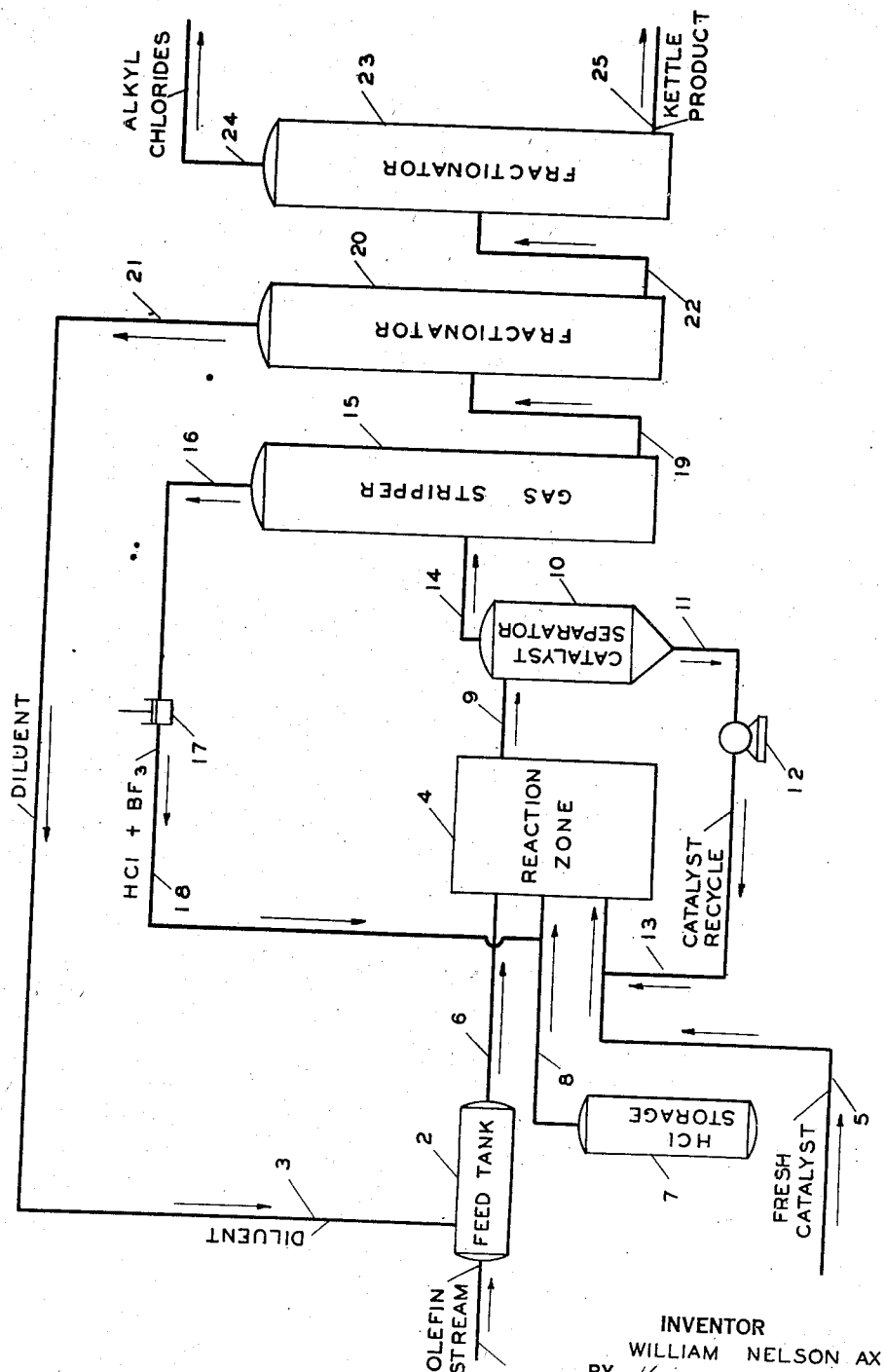

2,434,093

UNITED STATES PATENT OFFICE 2,434,093

HYDROCHLORINATION PROCESS

William Nelson Axe, Bartlesville, Okla., assignor to Phillips Petroleum Company, a corporation of Delaware Application July 10, 1944, Serial No. 544,319

9 Claims. (Cl. 260—663)

1

This invention relates to a process for the conversion of olefinic hydrocarbons to alkyl chlorides. In one of its more specific aspects, the present invention relates to a process for the hydrochlorination of olefinic hydrocarbons under the influence of a novel catalytic agent comprising a boron fluoride hydrate.

Alkyl chlorides are a valuable class of organic intermediates which have long been employed in the classical Wurtz-Fittig, Friedel-Crafts and Grignard syntheses, as well as in industrial adaptations of such reactions. More recently, alkyl chlorides, especially those having relatively high molecular weights, have assumed increasing importance as primary intermediates for the production of alcohols, amines, mercaptans and the like. Since, in the past, alkyl chlorides were prepared from the corresponding alcohols, they could not be considered a source of alcohols. With the increasing availability of olefinic hydrocarbons from the petroleum industry, hydrochlorination reactions designed to produce specific monohalides for a variety of applications have attained considerable industrial significance.

The addition of halogen acids or hydrogen halides to olefinic hydrocarbons is a well-established reaction. Of the hydrogen halides, hydrogen chloride is the most refractory of the group and adds to olefins with the greatest difficulty. A variety of problems arise in attempting to effect the hydrochlorination of olefins. For example, isobutylene readily absorbs hydrogen chloride at atmospheric temperatures and pressure, whereas ethylene requires severe conditions and generally the presence of a catalyst to effect the addition reaction. Generally the more complex the molecular structure or configuration and the higher the molecular weight, the more readily does the olefin react with hydrogen chloride. Because of the wide variety and the severity of reaction conditions that may be required with particular olefins, the employment of catalysts in order to facilitate the reaction and reduce variations between the respective olefins is of considerable importance with respect to industrial exploitation of such hydrochlorination processes.

It is an object of this invention to provide a catalytic process for the production of alkyl chlorides from olefinic hydrocarbons and hydrogen chloride.

Another object of the invention is to provide a process for the production of alkyl chlorides from olefinic hydrocarbons and hydrogen chloride in the presence of a catalyst comprising a normally liquid hydrated boron fluoride.

A further object of the present invention is to provide an efficient catalytic process for the direct addition of hydrogen chloride to olefinic hydrocarbons under relatively mild reaction conditions that are generally similar for all olefins regardless of molecular structure or configuration.

Other objects and advantages of the invention, some of which are referred to specifically hereinafter, will be obvious to those skilled in the art to which the invention pertains.

It has been found that the catalyst composition of this invention, which is exemplified by boron fluoride hydrate, is capable of catalyzing the addition of substantially anhydrous hydrogen chloride to olefinic hydrocarbons under extremely mild reaction conditions, for example, at such mild reaction conditions that the reactions do not proceed, for all practical purposes, in the absence of the catalyst. Thus, for example, representative olefins, isobutylene excepted, have been converted to alkyl chlorides at atmospheric temperatures and pressures, whereas, under the same conditions but in the absence of the catalyst, no substantial amounts of alkyl chlorides were produced.

The hydrochlorination of olefins in the presence of a boron fluoride catalyst has heretofore been described. Boron fluoride is a normally gaseous substance which is not readily separable from hydrogen chloride. By the use of the normally liquid catalyst composition of the present invention, the amount of catalyst and its activity are more easily controlled, the catalyst is less difficult to handle and use, and the unreacted hydrogen chloride is more readily separated from the catalyst for reuse in the process.

While I have found that the preferred catalyst composition of my invention is capable of functioning as a hydrochlorination catalyst at atmospheric pressure, I prefer, in most instances, especially those involving continuous large-scale reactions, to use elevated pressures, in the interest of operational expediency. Ordinarily liquid-liquid contacting of catalyst and reactants is the preferred mode of operation. In its broader aspects, the present process involves the introduction of the olefin, an inert diluent and a stoichiometrical excess of hydrogen chloride with respect to olefin into the reaction zone containing the liquid boron fluoride hydrate catalyst. Sufficient pressure is maintained in the reaction zone to favor substantially complete solution of the hydrogen chloride while temperatures are ordinarily controlled at levels below approximately 150° F. The reactor may be of any conventional design which will insure thorough commingling of reactants and catalyst during the reaction period. The reactor-effluent, after gravity separation of the catalyst, is stripped of excess hydrogen chloride and fractionated to separate the diluent from the product alkyl chlorides.

A specific embodiment of the process of the present invention is illustrated by the procedure for the conversion of octenes into octyl chlorides that is represented on the accompanying drawing, which is a simplified flow diagram of such process. The olefin charge, which may comprise an octene ($C_8H_{16}$) fraction of commercial n-butenes-isobutene codimer, is introduced through conduit 1 into tank 2 where it is intimately blended with an equal volume of an inert diluent such as n-pentane entering the tank through conduit 3. Fresh catalyst comprising liquid hydrated boron fluoride is charged to the reactor 4 through conduit 5. The hydrocarbon blend from tank 2 is charged under pressure through conduit 6 to reactor 4 while simultaneously anhydrous hydrogen chloride from storage tank 7 is transferred to the reaction zone 4 through conduit 8.

The hydrocarbon-catalyst volume ratio in reaction zone 4 may vary from approximately 10:1 to 20:1. The hydrogen chloride is charged at such a rate that a molecular excess of hydrogen chloride over olefin is maintained in the reaction zone at all times. The reaction is carried out under a pressure of approximately 500 to 600 pounds per square inch to insure substantial maintenance of liquid-liquid contacting between reactants and catalyst. The temperature in the reaction zone is preferably held at approximately 100° F. by means of any suitable conventional cooling installation (not shown in the drawing).

The emulsified effluent is discharged from reaction zone 4 through conduit 9 to separator 10, in which the catalyst phase is separated by gravity and recycled via conduit 11, pump 12, conduits 13 and 5 to reaction zone 4. The product phase from separator 10 is discharged through conduit 14 to gas stripper or stripping column 15, which is operated at atmospheric or a low superatmospheric pressure to remove substantially all free hydrogen chloride together with some boron fluoride. The hydrogen chloride stream is conducted by way of conduit 16 to compressor 17 and thence through conduit 18 to hydrogen chloride conduit 8. No separation of hydrogen chloride and boron fluoride is required, since the recycling of the boron fluoride serves to maintain catalyst activity. Ordinarily, it is desirable to include some boron fluoride in the hydrogen chloride charge when a new run is started until adequate boron fluoride in the recycle becomes available.

The kettle product from gas stripping column 15 is discharged via conduit 19 into fractionating column 20, where the pentane diluent is taken overhead through conduits 21 and 3 to the feed tank 2. The kettle product of column 20 comprising alkyl chlorides is taken through conduit 22 to fractionator 23, which is operated under diminished or subatmospheric pressure, to separate the product octyl chlorides from heavier materials including any hydrochlorinated heavy polymers. The octyl chlorides are transferred to storage through conduit 24 and the higher-boiling materials are withdrawn from fractionator 23 through conduit 25.

The preferred catalyst for use in the process of this invention may be prepared by passing gaseous boron fluoride into water until the desired hydrate concentration is realized. The solution of boron fluoride in water is accompanied by the evolution of heat and suitable cooling means should be provided. Since the specific gravity of a completely saturated solution is approximately 1.77, convenient control of the concentration can be effected by means of a hydrometer. The combination of water and boron fluoride may be carried out at atmospheric pressure or in a closed vessel at pressures ranging from 100 to 1000 pounds per square inch or higher. Formation of the catalyst under pressure is, however, more convenient and much less time-consuming.

The quantity of boron fluoride taken up when complete saturation is effected corresponds substantially to one mol of boron fluoride per mol of water. Although the catalyst preferably employed is water substantially saturated with boron fluoride, that is, the monohydrate $BF_3 \cdot H_2O$, an excess of water may be used to give any desired $BF_3 \cdot H_2O$ molecular ratio within the range of approximately 1 mol of boron fluoride to from 1 to 2 or more mols of water. The product is a dense fuming liquid at room temperature that has properties distinctly different from its original constituents.

Since the preferred catalyst of this invention have strong polymerizing action on olefinic hydrocarbons, hydrochlorination reactions are preferably carried out with a molecular excess of hydrogen chloride with respect to olefin. Satisfactory reaction mixtures are those having molecular ratios of hydrogen chloride to olefin within the range from approximately 1:1 to approximately 6:1, with the intermediate range from 2:1 to 5:1 being in general preferred.

It is advantageous to employ an inert hydrocarbon diluent in the reaction of the present process. The presence of a diluent simplifies temperature control and the maintenance of an adequate molecular ratio of hydrogen chloride to olefin at relatively moderate pressures. Saturated normal paraffinic hydrocarbons, such as propane, n-butane and n-pentane, are ordinarily preferred diluents. The relative quantity of diluent used will depend on the type of operation and the olefin being reacted and may vary from approximately 10 to approximately 90 volume per cent of the total hydrocarbon feed.

Because of the high degree of activity displayed by the catalyst composition of this invention, moderate reaction temperatures may be employed with a wide variety of olefin feed stocks. In general, reaction temperatures within the range from approximately 32° F. to approximately 150° F. are adequate for the hydrochlorination of olefins extending from ethylene to those having 16 or more carbon atoms in the molecule. A more restricted temperature range of approximately 75° to approximately 150° F. is ordinarily preferred from the standpoint of temperature control.

Pressures of substantially atmospheric to approximately 1000 pounds per square inch may be employed in the reaction zone. Because of the unusual activity of the boron fluoride hydrate catalyst it is possible to prepare a variety of alkyl chlorides at atmospheric pressure. The employment of elevated pressures, however, is beneficial with respect to catalyst life since the passage of excess hydrogen chloride through the reaction mixture tends to carry off free boron fluoride, thereby diminishing the activity of the catalyst. Pressures are generally selected which provide for substantial liquid-liquid contacting of the reactant and catalyst phases.

In order to further illustrate the specific uses and advantages of the present invention, the following exemplary operations are described. However, since these and numerous other process modifications will be obvious from the disclosure, no undue limitations are intended except as hereinafter imposed by the claims.

*Example I*

The hydrochlorination of ethylene was effected in the presence of propane under the catalytic influence of a boron fluoride hydrate. A reactor of the turbo-mixer type equipped with an external catalyst separator and a gravity-operated catalyst recycle line was used. The reactor was charged with approximately 800 ml. of catalyst consisting of boron fluoride monohydrate ($BF_3 \cdot H_2O$). An ethylene mixture, comprising 14.7 weight per cent by weight of ethylene in propane, was then charged to the reaction zone by means of a pump. Anhydrous hydrogen chloride was metered to the reactor through a separate line at a rate adjusted to give a molecular ratio of hydrogen chloride to ethylene of approximately 2:1. The temperature was held at 115° to 130° F. by means of a water bath and the pressure was maintained at 700 pounds per square inch gauge. Feed rates were regulated to give a total effluent rate of approximately 5.5 liters per hour.

The total effluent was charged to a stabilizing still operated at a pressure of approximately 300 to 350 pounds per square inch gauge, from which hydrogen chloride and traces of boron fluoride were taken overhead while maintaining a propane total reflux. Subsequent to the removal of the inorganic halogen compounds, the propane was taken overhead to yield a crude stabilized product. Fractionation of the kettle product yielded ethyl chloride and a polymeric material admixed with high-boiling chlorides.

Substantially complete reaction of the ethylene was realized. Approximately 95 per cent of the ethylene was converted to ethyl chloride.

*Example II*

Addition of hydrogen chloride to 2-butene was accomplished in the presence of a boron fluoride hydrate at atmospheric pressure while the temperature was maintained at 70° to 100° F. The reaction was carried out in a 2-liter glass flask equipped with a mechanical stirrer. The reaction vessel was charged with 500 ml. of n-heptane and 25 ml. of a catalyst similar to that described in Example I. While maintaining a good catalyst-hydrocarbon emulsion, 2-butene and a stoichiometrical excess of hydrogen chloride were introduced simultaneously into the reaction zone. The excess hydrogen chloride passing through the mixture was absorbed in a caustic soda solution of known titre. After the addition of 1.9 mols of olefin, the hydrocarbon phase was subjected to fractional distillation.

Substantially complete conversion of the olefin to alkyl chlorides was realized. A total charge of 161 g. of 2-butene and hydrogen chloride yielded 67 g. of butyl chlorides, 68 g. of octyl chlorides and small quantities of higher-boiling hydrochlorinated olefins and polymers. The $C_4$ chlorides fraction contained 52 per cent tertiary butyl chloride, as determined by precipitation of the chlorine with alcoholic silver nitrate solution.

An experiment carried out under substantially identical reaction conditions without a catalyst failed to yield any substantial amount of alkyl chlorides. The entire deheptanized reactor charge distilled within the boiling range of the 2-butene employed.

*Example III*

The catalytic addition of hydrogen chloride to diisobutylene was effected at atmospheric pressure using a boron fluoride hydrate catalyst. The catalyst and reaction procedure were essentially the same as those described in Example II. The reactor was charged with n-pentane diluent and catalyst. The diisobutylene was added to the reactor at the rate of approximately 32 g. per hour and the hydrogen chloride was metered into the reaction mixture at the rate of approximately 22 g. per hour. The reaction temperature was maintained at 70° to 84° F. Three separate batch runs were carried out with combination of the total product phases for evaluation. The total diisobutylene charged was 573 g. and the total hydrogen chloride consumed in the reaction was 208 g. The total product phase was depentanized at atmospheric pressure and the resultant crude product was fractionated under diminished pressure. The following product distribution was obtained:

| | Per cent by weight |
|---|---|
| Low-boiling ($C_3$) alkyl chlorides | 18 |
| Pentyl chlorides | 13 |
| Octyl chlorides | 53 |
| Higher-boiling chlorides | 16 |

An attempt to add hydrogen chloride to diisobutylene under the above conditions and in the absence of a catalyst failed. The depentanized material had a bromine number of 120, as compared with 126 for the original olefin feed, and negative tests for chloride were obtained by the sodium fusion method.

Although the present invention has been described in detail with respect to specific modifications, various other alternative procedures will be apparent to those skilled in the art to which the invention pertains. No undue restrictions are thereby intended since the scope of the invention is to be limited solely by the appended claims.

I claim:

1. A process for the production of an alkyl chloride which comprises reacting an olefinic hydrocarbon with substantially anhydrous hydrogen chloride in the presence of a catalyst comprising an addition product of boron fluoride and water in which at least 1 mol of water is present for each mol of boron fluoride.

2. A process for the production of an alkyl chloride which comprises reacting an olefinic hydrocarbon with substantially anhydrous hydrogen chloride in the presence of a normally liquid addition product consisting of water substantially completely saturated with boron fluoride.

3. A process for the production of an alkyl chloride which comprises reacting an olefinic hydrocarbon having from 2 to 16 carbon atoms in the molecule with substantially anhydrous hydrogen chloride in the presence of a normally liquid addition product consisting of water substantially completely saturated with boron fluoride.

4. A process for the production of an alkyl chloride which comprises passing substantially anhydrous hydrogen chloride together with an olefinic hydrocarbon having from 2 to 16 carbon atoms in the molecule in a normally liquid saturated hydrocarbon at a temperature within the range of approximately 32° to approximately 150° F. into the presence of a normally liquid addition product consisting essentially of boron fluoride monohydrate.

5. A process for the production of ethyl chloride which comprises passing a mixture comprising ethylene and hydrogen chloride in the molecular ratio of approximately 1 mol of ethylene to 2 mols of hydrogen chloride into contact with a normally liquid addition product consisting essentially of boron fluoride monohydrate while maintaining a reaction temperature within the range of approximately 115° to 130° F. and a pressure of approximately 700 pounds per square inch guage.

6. A process for the production of tertiary butyl chloride which comprises passing a mixture comprising 2-butene and hydrogen chloride, in which the hydrogen chloride is in stoichiometrical excess, into contact with a normally liquid addition product consisting essentially of boron fluoride monohydrate while maintaining a reaction temperature within the range of approximately 70° to approximately 100° F.

7. A process for the production of an octyl chloride which comprises passing diisobutylene together with a stoichiometrical excess of hydrogen chloride into contact with a normally liquid addition product consisting essentially of boron fluoride monohydrate while maintaining a reaction temperature within the range of approximately 70° to approximately 84° F.

8. A process for the production of an alkyl chloride which comprises passing substantially anhydrous hydrogen chloride together with an olefinic hydrocarbon having from 2 to 16 carbon atoms per molecule into intimate contact with a catalyst comprising a normally liquid addition product of boron fluoride and water, consisting essentially of boron fluoride monohydrate, in a reaction zone; maintaining reactants and said reaction zone at a temperature in the range from 32° F. to 150° F.; and maintaining sufficient pressure in said reaction zone to cause substantially complete solution of hydrogen chloride and to insure liquid-liquid contacting of reactants and catalyst.

9. A process for the production of an alkyl chloride which comprises passing substantially anhydrous hydrogen chloride together with an olefinic hydrocarbon having from 2 to 16 carbon atoms per molecule and a normally liquid saturated hydrocarbon into intimate contact with a catalyst comprising a normally liquid addition product of boron fluoride and water, consisting essentially of boron fluoride monohydrate, in a reaction zone; maintaining reactants and said reaction zone at a temperature in the range from 32° F. to 150° F.; and maintaining sufficient pressure in said reaction zone to cause substantially complete solution of hydrogen chloride and to insure liquid-liquid contacting of reactants and catalyst.

WILLIAM NELSON AXE.

REFERENCES CITED

The following references are of record in the file of this patent:

UNITED STATES PATENTS

| Number | Name | Date |
| --- | --- | --- |
| 2,103,692 | Piotrowski et al. | Dec. 28, 1937 |
| 2,140,507 | Chamberlain et al. | Dec. 20, 1938 |
| 2,186,916 | Wiezevich | Jan. 9, 1940 |

OTHER REFERENCES

Kastner, "Angewandte Chemie," vol. 54, page 273 (1941).